Feb. 19, 1957 — R. H. H. BARR — 2,781,998
BLADED ROTORS
Filed March 2, 1951

2,781,998
BLADED ROTORS

Richard H. H. Barr, Brentford, England, assignor of one-half to Centrax Power Units Limited, Brentford, England, a British company Application March 2, 1951, Serial No. 213,517

Claims priority, application Great Britain March 7, 1950

6 Claims. (Cl. 253—39)

This invention relates to bladed rotors for rotary power conversion machines working with elastic fluids, such as turbine or compressor rotors comprising a disc member carrying at the periphery a series of blades extending outwards in a substantially radial direction.

Where the size of the disc or equivalent body permits it is the usual practice for the blades to be separately fabricated and attached thereto, e. g. by means of suitably profiled root portions (on the blades) which are entered into retaining recesses formed in the periphery of the rotor body. The "fir-tree" method of securing blades, well-known in the gas turbine art, is an example of the current practice.

In making small rotors, however, there is often difficulty in providing for the attachment of separately fabricated blades because there is insufficient space available at the periphery of the rotor body.

For this reason it has been proposed to make a bladed rotor in which the blades are integral with the body, for example by machining the whole (blades and body) from a solid forging. However, if the blades are close together for example in the case of a small rotor, there is difficulty in entering machining tools between the blades.

The present invention provides a bladed rotor for a rotary power conversion machine working with elastic fluids, wherein blades which, in the circumferential sense, are non-adjacent but equidistantly spaced, are formed integral with the rotor body, while the remaining blades of the same circumferential row are separately fabricated and attached to the body. In this specification the expression "non-adjacent blades" means blades which in the finished rotor do not lie immediately next to each other.

Within its broad scope the present invention may provide a bladed turbine or compressor rotor for elastic fluids comprising a disc member carrying blades extending outwards from the periphery, wherein blades which, in the circumferential sense, are non-adjacent but equidistantly spaced, are formed integral with the rotor disc, while the remaining blades of the same circumferential row are separately fabricated and attached to the disc.

For the sake of example various specific constructions of small rotor according to the invention will now be described with reference to the accompanying drawings, in which:

Figure 1 is a fragmentary perspective view of a bladed rotor according to the invention.

Figures 2, 3, 4, and 5 are each fragmentary end views of bladed rotors according to alternative constructions within the invention.

Figure 1:
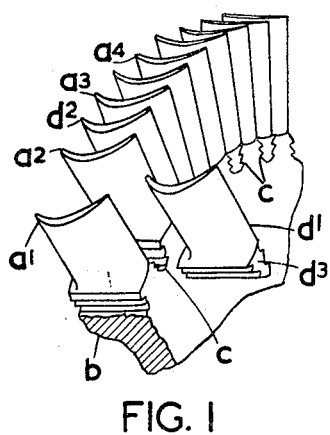

The bladed axial flow turbine rotor shown in Figure 1 comprises a disc portion $b$ having integral blade elements $a^1$, $a^2$, $a^3$, $a^4$ etc. which alternate with separately fabricated and attached blades $d^1$, $d^2$ etc. Between integral blades the disc $b$ is formed with "fir-tree" recesses $c$ into which are engaged the "fir-tree" roots $d^3$ on the blades $d^1$ etc. The disc portion $b$ and the integral blade elements form, in this case, a single solid forging which is machined to final shape. The recesses $c$ are separately machined.

Figures 2, 3, 4:
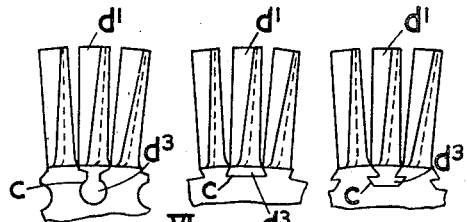
Figures 5, 6:
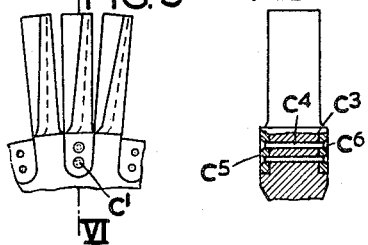
Figure 6 is a section on line VI—VI of Figure 5.

In Figures 2–6 the same general arrangement is adopted but the separately fabricated blades $d^1$ are secured by different attachment means. In Figure 2 the "bulb root" type of fixing is used, in which a bulbous root $d^3$ on the blade is engaged on a recess $c$. In Figure 3 a dove-tailed platform $d^3$ on the blade is engaged into an appropriately shaped recess $c$, while in Figure 4 a serrated root attachment similar to the "fir-tree" is used. In Figure 5 each separate blade $d^1$ etc. comprises a root platform from which extend spaced fork members $c^5$, $c^6$ which straddle the periphery of the disc (which is reduced in thickness at $c^3$) and are secured by rivets $c^4$.

Figure 7:
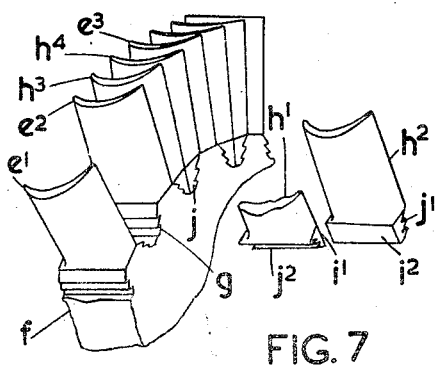
Figure 7 is a view similar to Figure 1 but showing a modified type of rotor in which each integral blade is separated by two separately attached blades.

In Figure 7 the rotor comprises a disc member $f$ having integral blade elements $e^1$, $e^2$, $e^3$, etc. between each pair of which is interposed a pair of separately fabricated and attached blades (such as $h^1$, $h^2$ or $h^3$, $h^4$). Each pair of separately attached blades in secured by engaging their roots in a single "fir-tree" recess such as $g$ or $j$ and for this purpose the root profile of each blade comprises a flat face $i^1$ or $i^2$ and a serrated face $j^1$ or $j^2$, the flat faces being abutted to each other in "back to back" formation so that the two roots jointly form the equivalent of a single "fir-tree" root.

Figures 8, 9:
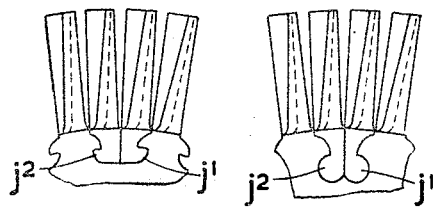
Figures 8 and 9 are views similar in nature to Figures 2–5, but showing modifications of the blade root structure of separately attached blades.

Figures 8 and 9 show constructions which in principle are the same as Figure 7, but in which the attachment of the separate blades differs in detail.

In Figure 8 the attachment is analogous to that of Figure 4, while Figure 9 is analogous to Figure 2.

I claim:

1. A rotor for an axial fluid flow energy conversion machine comprising a body member of circular elevation having at its periphery blade-root receiving sockets spaced apart in the peripheral direction, energy converting blades formed integrally with said body member and extending radially therefrom between some at least of said sockets, there being at least one socket between the blades of each adjacent pair of said integral blades and blade-root retaining means extending from the body member into the sockets, the said retaining means being capable in operation of taking the whole of the centrifugal stresses of blades retained in the sockets.

2. A bladed rotor for an axial fluid flow energy conversion machine comprising a body member of circular elevation having at its periphery blade-root receiving sockets spaced apart in the peripheral direction, energy converting blades formed integrally with said body member and extending radially therefrom between some at least of said sockets, there being at least one socket between the blades of each adjacent pair of said integral blades, separately fabricated blades, roots thereon received in the said sockets and blade-root retaining means extending from the body member into the sockets, the said retaining means, in operation, taking the whole of the centrifugal stresses of said separately fabricated blades.

3. A bladed rotor as claimed in claim 2 in which said blade-root receiving sockets each extend axially of the body member and said blade-root retaining means comprise an undercut recess in each of the sockets and in which a projection on the root of each of said separately fabricated blades is arranged to correspond with and be retained by said recess.

4. A bladed rotor as claimed in claim 2 in which each of said blade-root receiving sockets comprises a slot on each end face of the body member; in which fork members are provided on each root of the separately fabricated blades, are arranged to straddle the rim of the body member and to be engaged in the said slots and in which the blade-root retaining means comprise rivets passing through the body member and extending into the slots and through the fork members.

5. A bladed rotor as claimed in claim 2 in which there are two separately fabricated blades between each two adjacent integral blades.

6. A bladed rotor for an axial fluid flow energy conversion machine comprising a body member of circular elevation having at its periphery blade-root receiving sockets spaced apart in the peripheral direction, energy converting blades formed integrally with said body member and extending radially therefrom between the sockets, the sockets and integral blades being arranged alternately around the periphery of the body member, separately fabricated blades arranged in pairs, a root on each blade of said latter blade pairs abutting the root of the other blade of the same pair, the abutting roots fitting into the same socket, and blade-root retaining means extending from the body member into the sockets, the said retaining means, in operation, engaging the roots of each of the separately fabricated blades and taking the whole of the centrifugal stresses of the said separately fabricated blades.

References Cited in the file of this patent

UNITED STATES PATENTS

| | | |
|---|---|---|
| 1,039,915 | Faber | Oct. 1, 1912 |
| 1,142,690 | Francke | June 8, 1915 |
| 1,250,005 | Phillips | Dec. 11, 1917 |
| 1,279,800 | Warriner | Sept. 24, 1918 |
| 1,890,581 | Kohler | Dec. 13, 1932 |
| 1,919,970 | Woods | July 25, 1933 |
| 2,255,486 | Doran | Sept. 9, 1941 |
| 2,337,700 | Wareham | Dec. 28, 1943 |

FOREIGN PATENTS

| | | |
|---|---|---|
| 15,893 | Great Britain | 1908 |
| 369,127 | Great Britain | 1932 |
| 555,135 | Great Britain | 1943 |